Sept. 23, 1969  P. I. KRASNOW ET AL  3,468,710
SEA WATER BATTERY
Filed Feb. 16, 1966
FIG. 1
FIG. 2
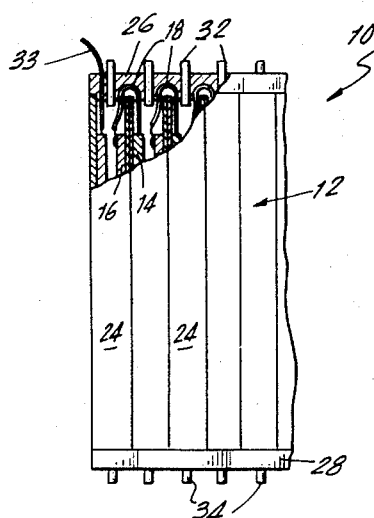
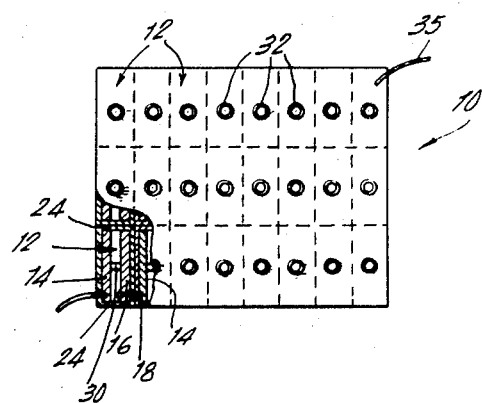
FIG. 3
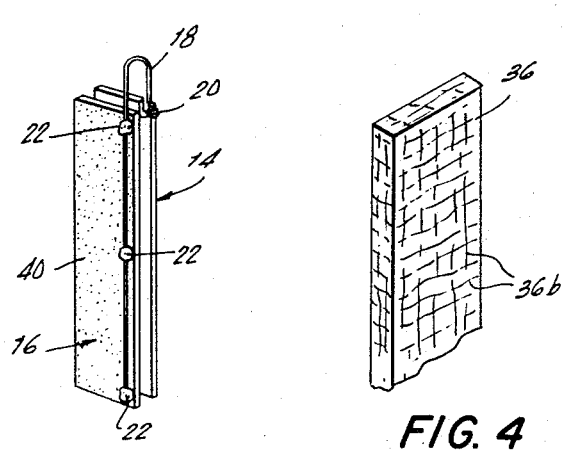
FIG. 4
FIG. 5
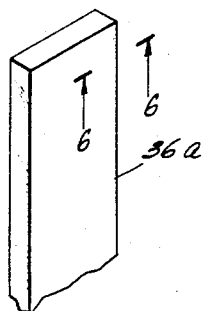
FIG. 6
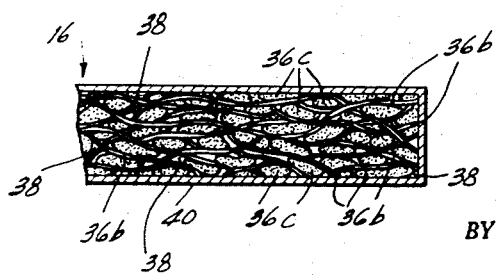
INVENTORS
PHILIP I. KRASNOW
JEROME GOODMAN
BY Amster & Rothstein
ATTORNEYS

## 3,468,710
SEA WATER BATTERY

Philip I. Krasnow, Brooklyn, and Jerome Goodman, New York, N.Y., assignors to Nuclear Research Associates, Inc., New Hyde Park, N.Y., a corporation of Delaware
Filed Feb. 16, 1966, Ser. No. 527,876
Int. Cl. H01m *35/02, 35/30*
U.S. Cl. 136—26                                     3 Claims

ABSTRACT OF THE DISCLOSURE

A cathode electrode for a sea water battery having an absorbent porous body supporting particles of lead chloride which are absorbed in said body while the lead chloride is in a molten state.

---

The present invention relates generally to sea water batteries, and more particularly to certain improvements for such batteries including the use of a material providing a highly efficient electro-chemical energy source and a practical embodiment for a battery cathode electrode fabricated of such material.

It is well known that certain dissimiliar metals possess electro-chemical properties which, in an environmnt of sea water as an electrolyte, can be made to efficiently produce an electric current. These combinations of materials enjoy wide use in sea water batteries. Some popular examples are the zinc-cupric oxide couple of U.S. Patent 2,692,215 and the magnesium-tin chloride couple of U.S. Patent 3,005,864, to mention a few. The efficiency and power of the battery is dependent upon the couple used as the energy source thereof, and so it is natural that there is considerable effort expended to render practical the use of dissimilar metal couples that offer the greatest potential. One such metal is lead chloride as the cathode electrode which, in accordance with the present invention, is used in a cell with magnesium as the anode electrode and provides an electro-chemical energy source with outstanding efficient operation in a sea water battery. The use of lead chloride in a battery, however, is difficult to achieve because this material is extremely fragile and does not possess sufficient inherent mechanical strength to withstand the abuse of normal use of a sea water battery.

Broadly, it is an object of the present invention to provide lead chloride in an improved form for use in a sea water battery to overcome the foregoing and other shortcomings of the prior art. Specifically, it is an object to provide an embodiment of a cathode electrode having lead chloride as the essential material of construction thereof and one which has acceptable mechanical as well as electro-chemical properties to function efficiently in a sea water activated battery.

A cathode electrode for a sea water battery demonstrating features of the present invention comprises the combination of lead chloride particles in a network of fibers of the body serving as the battery cathode electrode, said fibrous network providing support to the lead chloride and adequately protecting the same against vibration and shock. As a result of this structure, practical use can be made of lead chloride in an energy source couple for a sea water battery.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a partial elevational view of a sea water battery with portions thereof broken away and in section to better illustrate the internal construction thereof;

FIG. 2 is a plan view of the sea water battery with portions broken away and in section;

FIG. 3 is an isolated perspective view of a pair of series connected electrodes of the battery;

FIG. 4 is a partial perspective view, on an enlarged scale, of the cathode electrode at an early stage in the fabrication thereof for use in the battery in accordance with the present invention;

FIG. 5 is a view similar to FIG. 4 but illustrating the cathode electrode in a completed condition as actually used in the sea water battery hereof; and FIG. 6 is a greatly enlarged sectional view, taken on line 6—6 of FIG. 5, diagrammatically illustrating the internal construction of the cathode electrode.

Reference is now made to the drawings wherein there is shown a sea water battery, generally designated 10, demonstrating features of the present invention. More particularly, these inventive features of the battery 10 reside more in the circumstances giving rise to use of lead chloride as the essential material for the cathode electrode rather than in the structural features of the battery per se. As is generally understood in the functioning of batteries, a plurality of electrodes of appropriate dissimilar materials are series connected to each other and due to well understood electro-chemical principles are made to produce electric current. In accordance with the present invention, the battery 10 employs magnesium as the anode and lead chloride as the cathode, and in the presence of sea water as the electrolyte, the chemical reaction is as follows:

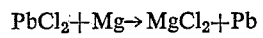

$$PbCl_2 + Mg \rightarrow MgCl_2 + Pb$$

As is further generally understood, the foregoing chemical reaction results in the liberation of electrons which in turn produces an electric current. As to these broad aspects, the battery 10 of the present invention is similar to prior art sea water batteries employing such couples as zinc-cupric oxide or magnesium-lead chloride.

In order to employ the electro-chemical properties of lead chloride to advantage in a sea water battery, certain shortcomings of this material must be overcome, such as extreme fragileness, so that this material in the form of a battery electrode can withstand the vibration and shock resulting from normal battery use. These shortcomings are overcome by the improvements of the present invention which are directly responsible for transforming lead chloride into an acceptable embodiment for a cathode electrode having the requisite mechanical and electrical characteristics particularly suited for efficient functioning in a sea water battery.

Turning first to the general battery construction, the battery 10 has a plurality of series connected cells, generally designated 12, which are each formed by a magnesium anode electrode 14 and a lead chloride cathode electrode 16. The series connection is achieved by a conductor 18 appropriately connected, as at 20, the magnesium anode 14 and to the lead chloride cathode 16 of an adjacent cell at plural locations 22, as by soldering or the like, along an edge of the lead chloride cathode 16. As is best seen in FIG. 2 the battery 10, is in preferred embodiment, includes rectangular containers 24 for each of the individual cells 12 and the lead chloride cathode 16 of one cell is electrically connected to the magnesium anode 14 of the adjacent cell by the conductor 18 connected therebetween and threaded through a cover plate 26 disposed over the upper ends of the container 24. A base plate 28 is appropriately mounted to the lower ends of the containers 24. The magnesium anode 14 and lead chloride cathode 16 of each cell 12 are separated by a spacer element 30 interposed therebetween. A plurality of tubes 32 and 34 mounted in any appropriate manner in the cover plate 26 and base plate 28 function as means for initially introducing the sea water electrolyte into the battery 10 and for later flushing this sea water with the chemical reaction by-products from the battery. Completing the battery 10 are the usual main battery leads 33 and 35 for connecting the battery to appropriate circuitry.

In a sea water battery as is exemplified by the battery 10 just described, use can effectively be made of a magnesium-lead chloride couple despite the fact that lead chloride inherently lacks the strength to withstand the abuse of normal use if a sea water battery. This is achieved in accordance with the present invention by combining the lead chloride with a fibrous body 36 such as is diagrammatically illustrated in FIG. 4. A particularly suitable fibrous material for the fibrous body 36 is a product sold under the trademark "Fiberfrax" by Union Carbide of New York, N.Y. and consisting of fibers of silicon dioxide and aluminum oxide. These materials, like asbestos and other such materials, are well known for their resistance to comparatively high temperature. Additionally, because of its fibrous nature, the body 36, due to capillary action as well as to inherent characteristics of the materials possesses a high degree of absorbency for liquids which, as will soon be apparent, is used to advantage to achieve the combination of this material with the lead chloride.

Starting with a fibrous body 36 having the attributes of being able to withstand comparatively high temperatures without disintegration and also having a relatively high degree of absorbency, the mechanical combination of this material with lead chloride to produce an acceptable embodiment of a cathode in a sea water battery, as is exemplified by the lead chloride cathode electrode 16 hereof, is achieved by dipping or otherwise placing the fibrous body 36 in contact with molten lead chloride which in the molten state is at a temperature of about 1000° F. However, because of the inherent resistance of the materials of construction of the fibrous body 36 to such high temperatures no adverse effect results. Upon contact, however, of the fibrous body 36 with the molten lead chloride, the lead chloride is absorbed within the body, and more particularly into the spaces, collectively designated 38, which exists between the fibers (see FIG. 6). This results in the transformation of the fibrous body 36 into a solid bar or block 36a, such as is shown in FIG. 5, which has sufficient strength to withstand considerable abuse and stress as occurs during normal use of a typical sea water battery.

As is best shown diagrammatically in FIG. 6, the transformed body 36a, when viewed under highly magnified conditions, includes a mass or network of fibers, herein collectively designated 36b, and a plurality of solidified particles or bodies of lead chloride, collectively designated 36c in areas which previously were the spaces 38b. This resulting structure of fibers 36b and lead chloride particles 36c in turn results in the network of fibers 36b providing support to the solidified lead chloride particles 36c. Additionally, the location of the lead chloride particles 36c inwardly of the surfaces of the transformed body 36a provides sufficient protection against breakage thereof and other manifestations of the fragile nature of this material with the result that it has been found that the transformed body 36a is entirely satisfactory for use in a sea water battery.

For reasons which are well understood, it is desirable to start the chemical reaction at the cathode electrode by using a pure lead material, and in accordance with the present invention this is preferably done by applying a surface coating of lead 40 to the transformed body 36a. One convenient way in which this is achieved is by painting the transformed body 36a with any conventional paint having a usual high content of lead.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A sea water battery cathode electrode of a predetermined extent comprising the combination of an absorbent, porous body of an extent equal to that of said cathode electrode consisting of fibers having a resistance to comparatively high temperatures, said fibers having an operative arrangement throughout said body such that adjacent fibers bound plural spaces throughout said body, and lead chloride supported in said plural spaces of said body, said lead chloride being absorbed within said plural spaces while the porous body is in a molten bath of said lead chloride.

2. An electrode for a sea water battery as defined in claim 1 including a conductive surface coating of lead to facilitate the start of the chemical reaction at said electrode.

3. An electrode for a sea water battery as defined in claim 1 wherein said fibers are fabricated of silicon dioxide and aluminum oxide.

References Cited

UNITED STATES PATENTS

| 2,577,936 | 12/1951 | Waggoner | 65—3 |
| 3,268,312 | 8/1966 | Grant | 65—3 |
| 3,223,556 | 12/1965 | Cohn et al. | 136—86 |
| 3,259,522 | 7/1966 | Voss et al. | 136—27 |
| 3,309,228 | 3/1967 | Dodson et al. | 136—26 |

OTHER REFERENCES

"Storage Batteries," 3rd edition, John Wiley & Sons, Inc., pp. 21 and 31.

WINSTON A. DOUGLAS, Primary Examiner

C. F. LEFEVOUR, Assistant Examiner

U.S. Cl. X.R.

136—120